(12) United States Patent
Nakajima et al.

(10) Patent No.: US 9,702,290 B2
(45) Date of Patent: Jul. 11, 2017

(54) CONTROL APPARATUS AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Toshiya Nakajima, Susono (JP); Koji Kitano, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/027,600

(22) PCT Filed: Oct. 1, 2014

(86) PCT No.: PCT/IB2014/001988
§ 371 (c)(1),
(2) Date: Apr. 6, 2016

(87) PCT Pub. No.: WO2015/052566
PCT Pub. Date: Apr. 16, 2015

(65) Prior Publication Data
US 2016/0251988 A1    Sep. 1, 2016

(30) Foreign Application Priority Data
Oct. 7, 2013    (JP) ................. 2013-210468

(51) Int. Cl.
*F01N 3/00*    (2006.01)
*F01N 3/10*    (2006.01)
(Continued)

(52) U.S. Cl.
CPC ........... *F01N 3/2006* (2013.01); *F01N 3/021* (2013.01); *F02D 19/0634* (2013.01);
(Continued)

(58) Field of Classification Search
CPC ............ F02D 19/0634; F02D 19/0649; F02D 41/0007; F02D 41/0025; F02D 41/0055;
(Continued)

(56) References Cited

U.S. PATENT DOCUMENTS

2008/0243358 A1* 10/2008 Kojima ................. F02D 35/025
                                                            701/102
2015/0300283 A1    10/2015 Nakajima et al.

FOREIGN PATENT DOCUMENTS

DE    10 2009 044 221 A1    5/2010
JP              2005-133563    5/2005
(Continued)

*Primary Examiner* — Phutthiwat Wongwian
*Assistant Examiner* — Diem Tran
(74) *Attorney, Agent, or Firm* — Finnegan, Henderson, Farabow, Garrett & Dunner, LLP

(57) ABSTRACT

A control apparatus for an internal combustion engine is provided. The internal combustion engine includes an exhaust catalyst and a fuel injection valve. The control apparatus includes: an electronic control unit. The electronic control unit is configured to: (a) acquire a cetane number of a fuel for the internal combustion engine; (b) acquire a target light-off temperature on the basis of the cetane number, the target light-off temperature being a light-off temperature of the exhaust catalyst; (c) acquire an exhaust gas temperature of the internal combustion engine; and (d) when the exhaust catalyst is heated, control additional injection on the basis of a difference between the exhaust gas temperature and the target light-off temperature, the additional injection being carried out after main injection of the fuel injection valve.

10 Claims, 8 Drawing Sheets

(51) Int. Cl.
  *F01N 3/20* (2006.01)
  *F02D 41/02* (2006.01)
  *F02D 41/14* (2006.01)
  *F02D 41/40* (2006.01)
  *F02D 19/06* (2006.01)
  *F02D 41/00* (2006.01)
  *F01N 3/021* (2006.01)
  *F02D 41/26* (2006.01)
  *F02M 63/02* (2006.01)
  *F02M 26/05* (2016.01)

(52) U.S. Cl.
  CPC ..... *F02D 19/0649* (2013.01); *F02D 41/0007* (2013.01); *F02D 41/0025* (2013.01); *F02D 41/0055* (2013.01); *F02D 41/0245* (2013.01); *F02D 41/1446* (2013.01); *F02D 41/26* (2013.01); *F02D 41/405* (2013.01); *F02M 63/0225* (2013.01); *F02D 2200/0611* (2013.01); *F02M 26/05* (2016.02); *Y02T 10/26* (2013.01); *Y02T 10/36* (2013.01); *Y02T 10/44* (2013.01)

(58) Field of Classification Search
  CPC .. F02D 41/0245; F02D 41/1446; F02D 41/26; F02D 41/405; F02M 26/05; F02M 63/0225; Y02T 10/26; Y02T 10/36; Y02T 10/44; F01N 3/2006
  USPC .......................................... 60/284, 285, 299
  See application file for complete search history.

(56) References Cited

FOREIGN PATENT DOCUMENTS

| | | | |
|---|---|---|---|
| JP | 2006-183581 | | 7/2006 |
| JP | 2006183581 | * | 7/2006 |
| JP | 2007-40221 | | 2/2007 |
| JP | 2007-231790 | | 9/2007 |
| JP | 2011-117310 | | 6/2011 |
| JP | 2011-149388 | | 8/2011 |
| WO | WO 2014/081009 A1 | | 5/2014 |

* cited by examiner

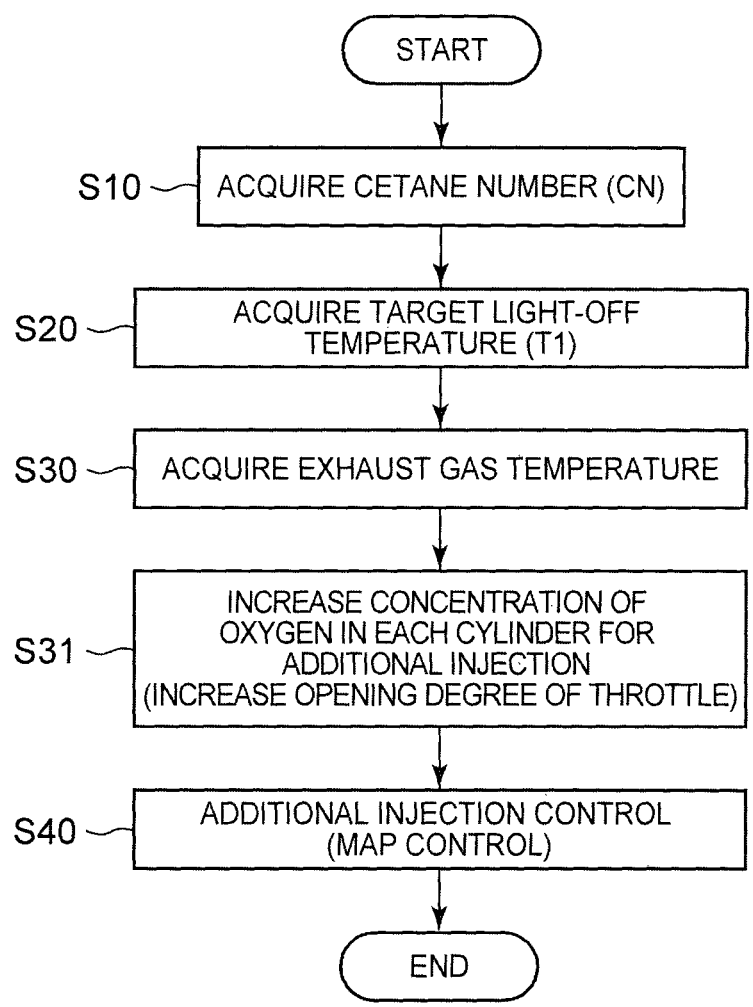

CONTROL APPARATUS AND CONTROL METHOD FOR INTERNAL COMBUSTION ENGINE

CROSS-REFERENCE TO RELATED APPLICATIONS

This application is a national phase application of International Application No. PCT/IB2014/001988, filed Oct. 1, 2014, and claims the priority of Japanese Application No. 2013-210468, filed Oct. 7, 2013, the content of both of which is incorporated herein by reference.

BACKGROUND OF THE INVENTION

1. Field of the Invention

The invention relates to a control apparatus and control method for an internal combustion engine.

2. Description of Related Art

There is known a control apparatus for an internal combustion engine including an exhaust catalyst. As a technique related to such a control apparatus for an internal combustion engine, for example, Japanese Patent Application Publication No. 2007-231790 (JP 2007-231790 A) describes a technique for changing a fuel injection amount on the basis of the cetane number of a fuel when an exhaust catalyst of an internal combustion engine is heated. Another document associated with the present application is Japanese Patent Application Publication No. 2007-40221 (JP 2007-40221 A). JP 2007-40221 A describes a technique for increasing an exhaust gas temperature by carrying out additional injection (specifically, post injection) after main injection in an internal combustion engine including an exhaust catalyst.

SUMMARY OF THE INVENTION

Incidentally, as a result of research of the inventors of the present application, it is found that the light-off temperature (temperature at which the exhaust catalyst is activated) of the exhaust catalyst changes on the basis of the cetane number. Specifically, it is found that the light-off temperature of the exhaust catalyst tends to increase as the cetane number decreases. In the technique according to JP 2007-231790 A, fluctuations in the light-off temperature with a change in the cetane number are not taken into consideration, so, when a fuel having a low cetane number is used, there is a possibility that an increase in the temperature of the exhaust catalyst is insufficient at the time when the exhaust catalyst is heated. In this case, there is a possibility that a deposit accumulates in the exhaust catalyst.

The invention provides a control apparatus and control method for an internal combustion engine, which are able to suppress accumulation of a deposit in an exhaust catalyst when a fuel having a low cetane number is used.

A first aspect of the invention provides a control apparatus for an internal combustion engine. The internal combustion engine includes an exhaust catalyst and a fuel injection valve. The control apparatus includes an electronic control unit. The electronic control unit is configured to: (a) acquire a cetane number of a fuel for the internal combustion engine; (b) acquire a target light-off temperature on the basis of the cetane number, the target light-off temperature being a light-off temperature of the exhaust catalyst; (c) acquire an exhaust gas temperature of the internal combustion engine; and (d) when the exhaust catalyst is heated, control additional injection on the basis of a difference between the exhaust gas temperature and the target light-off temperature, the additional injection being carried out after main injection of the fuel injection valve.

With the control apparatus for an internal combustion engine according to the first aspect of the invention, it is possible to increase the exhaust gas temperature to the target light-off temperature. Thus, even when a fuel having a low cetane number is used, it is possible to suppress accumulation of a deposit in the exhaust catalyst.

In the control apparatus according to the first aspect of the invention, the electronic control unit may be configured to, when the exhaust catalyst is heated, control a concentration of oxygen in a cylinder of the internal combustion engine at the time of carrying out the additional injection on the basis of the difference between the exhaust gas temperature and the target light-off temperature. With this configuration, it is possible to suppress deterioration of a combustion state in the cylinder of the internal combustion engine.

In the control apparatus according to the first aspect of the invention, the electronic control unit may be configured to acquire an intake air amount of the internal combustion engine, and the electronic control unit may be configured to, when the exhaust catalyst is heated, control the additional injection on the basis of the intake air amount. When the intake air amount is large, it is presumable that there is a possibility that the temperature of the exhaust catalyst decreases. However, with this configuration, the intake air amount is further considered in controlling additional injection, so it is possible to further effectively suppress accumulation of a deposit in the exhaust catalyst.

In the control apparatus according to the first aspect of the invention, the electronic control unit may be configured to acquire a load of the internal combustion engine, and the electronic control unit may be configured to, when the exhaust catalyst is heated, control the additional injection on the basis of the load. When the load of the internal combustion engine changes, the exhaust gas temperature also changes, so it is presumable that the temperature of the exhaust catalyst also changes. With this configuration, the load of the internal combustion engine is further considered in controlling additional injection, so it is possible to further effectively suppress accumulation of a deposit in the exhaust catalyst.

In the control apparatus according to the first aspect of the invention, the additional injection may be one of after-injection and post-injection.

A second aspect of the invention provides a control method for an internal combustion engine. The internal combustion engine includes an exhaust catalyst, a fuel injection valve and an electronic control unit. The control method includes: acquiring, by the electronic control unit, a cetane number of a fuel for the internal combustion engine; acquiring, by the electronic control unit, a target light-off temperature on the basis of the cetane number, the target light-off temperature being a light-off temperature of the exhaust catalyst; acquiring, by the electronic control unit, an exhaust gas temperature of the internal combustion engine; and, when the exhaust catalyst is heated, controlling, by the electronic control unit, additional injection on the basis of a difference between the exhaust gas temperature and the target light-off temperature, the additional injection being carried out after main injection of the fuel injection valve.

With the control method for an internal combustion engine according to the second aspect of the invention, it is possible to increase the exhaust gas temperature to the target light-off temperature. Thus, even when a fuel having a low cetane number is used, it is possible to suppress accumulation of a deposit in the exhaust catalyst.

The control method according to the second aspect of the invention may further include, when the exhaust catalyst is heated, controlling, by the electronic control unit, a concentration of oxygen in a cylinder of the internal combustion engine at the time of carrying out the additional injection on the basis of the difference between the exhaust gas temperature and the target light-off temperature. With this configuration, it is possible to suppress deterioration of a combustion state in the cylinder of the internal combustion engine.

The control method according to the second aspect of the invention may further include: acquiring, by the electronic control unit, an intake air amount of the internal combustion engine; and, when the exhaust catalyst is heated, controlling, by the electronic control unit, the additional injection on the basis of the intake air amount. When the intake air amount is large, it is presumable that there is a possibility that the temperature of the exhaust catalyst decreases. However, with this configuration, the intake air amount is further considered in controlling additional injection, so it is possible to further effectively suppress accumulation of a deposit in the exhaust catalyst.

The control method according to the second aspect of the invention may further include: acquiring, by the electronic control unit, a load of the internal combustion engine; and, when the exhaust catalyst is heated, controlling, by the electronic control unit, the additional injection on the basis of the load. When the load of the internal combustion engine changes, the exhaust gas temperature also changes, so it is presumable that the temperature of the exhaust catalyst also changes. With this configuration, the load of the internal combustion engine is further considered in controlling additional injection, so it is possible to further effectively suppress accumulation of a deposit in the exhaust catalyst.

In the control method according to the second aspect of the invention, the additional injection may be one of after-injection and post-injection.

According to the invention, it is possible to provide the control apparatus and control method for an internal combustion engine, which are able to suppress accumulation of a deposit in the exhaust catalyst when a fuel having a low cetane number is used.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a view that shows an example of a flowchart at the time when a control apparatus according to a second embodiment executes heating control;

DETAILED DESCRIPTION OF EMBODIMENTS

Hereinafter, embodiments of the invention will be described.

Figure 1:
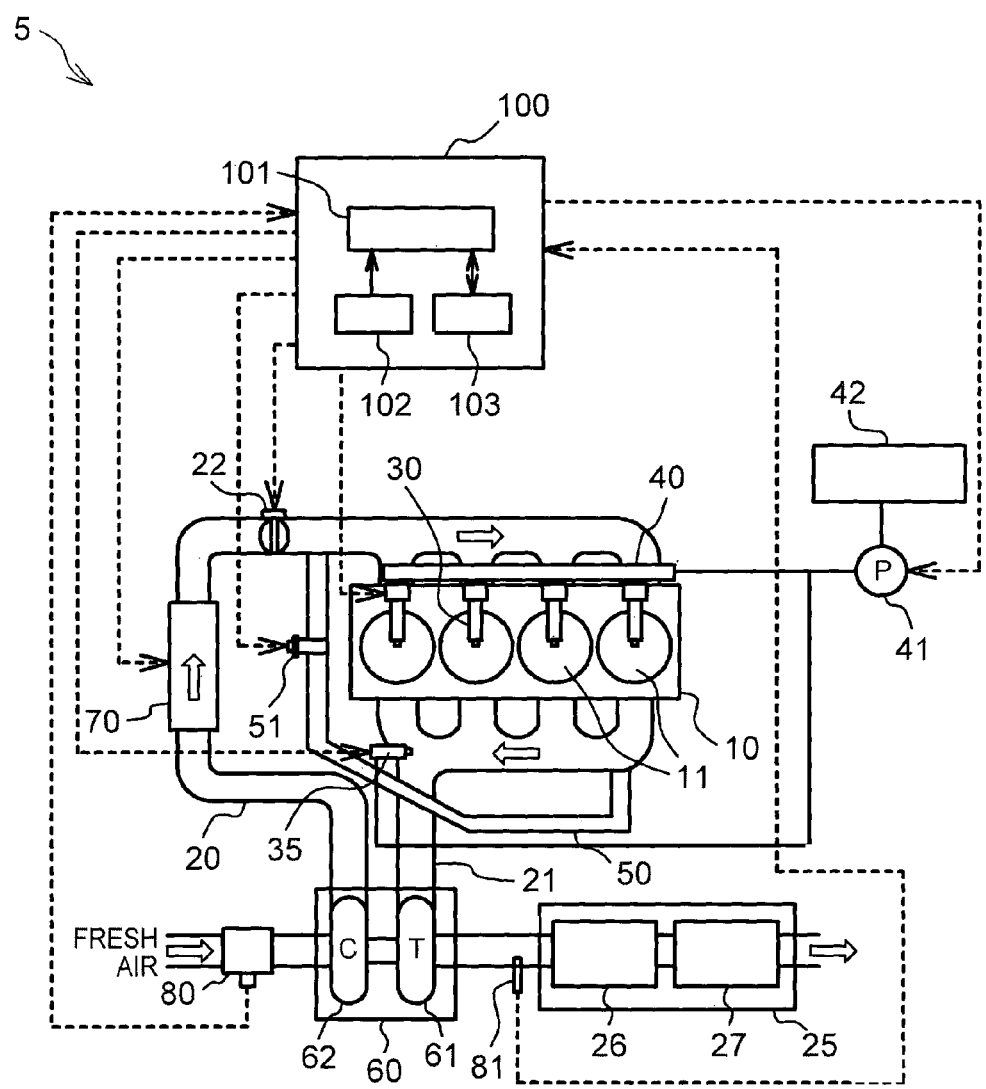
FIG. 1 is a schematic view that shows an example of an internal combustion engine to which a control apparatus according to a first embodiment is applied.

A control apparatus (hereinafter, referred to as control apparatus 100) for an internal combustion engine according to a first embodiment of the invention will be described. An example of the configuration of the internal combustion engine to which the control apparatus 100 is applied will be described first, and then the details of the control apparatus 100 will be described subsequently. FIG. 1 is a schematic view that shows an example of an internal combustion engine 5 to which the control apparatus 100 is applied. The internal combustion engine 5 shown in FIG. 1 is mounted on a vehicle. In the present embodiment, a compression ignition internal combustion engine (so-called diesel engine) is employed as an example of the internal combustion engine 5. The internal combustion engine 5 includes an engine body 10, an intake passage 20, an exhaust passage 21, a throttle 22, an exhaust emission control device 25, fuel injection valves 30, a fuel addition valve 35, a common rail 40, and a pump 41. The internal combustion engine 5 includes an exhaust gas recirculation (EGR) passage 50, an EGR valve 51, a turbocharger 60, an intercooler 70, various sensors (an air flow sensor 80 and a temperature sensor 81), and a control apparatus 100.

The engine body 10 includes a cylinder block, a cylinder head and pistons. Cylinders 11 are formed in the cylinder block. The cylinder head is arranged on the cylinder block. The pistons are respectively arranged in the cylinders 11. In the present embodiment, the number of the cylinders 11 is multiple (specifically, four). The intake passage 20 branches off at its downstream side, and the branched portions are respectively connected to the cylinders 11. Fresh air flows in from an upstream end of the intake passage 20. The exhaust passage 21 branches off at its upstream side, and the branched portions are respectively connected to the cylinders 11. The throttle 22 is arranged in the intake passage 20. The throttle 22 opens or closes upon reception of a command from the control apparatus 100, thus adjusting the amount of air that is taken into the cylinders 11 (intake air amount).

The exhaust emission control device 25 purifies exhaust gas in the exhaust passage 21. The exhaust emission control device 25 according to the present embodiment includes an exhaust catalyst 26 and a diesel particulate filter (DPF) 27. The exhaust catalyst 26 is a catalyst for purifying exhaust gas. The DPF 27 is a filter that collects particulate matter (PM). The exhaust catalyst 26 according to the present embodiment is arranged in the exhaust passage 21 on a downstream side of the turbocharger 60 in an exhaust gas flow direction. The DPF 27 according to the present embodiment is arranged on a downstream side of the exhaust catalyst 26 in the exhaust gas flow direction. In the present embodiment, an oxidation catalyst (specifically, a noble metal) is used as an example of the exhaust catalyst 26. However, the specific configuration of the exhaust catalyst 26 is not limited to a noble metal.

The plurality of fuel injection valves 30 according to the present embodiment are arranged in the engine body 10 so as to directly inject fuel into the corresponding cylinders 11. Fuel (in the present embodiment, light oil is used as a fuel) stored in a fuel tank 42 is fed under pressure by the pump 41, and is supplied to the common rail 40. The fuel is pressurized in the common rail 40, and then the high-pressure fuel is supplied to the fuel injection valves 30. The arrangement locations of the fuel injection valves 30 are not limited to the locations shown in FIG. 1. For example, the fuel injection valves 30 may be arranged so as to inject fuel into the intake passage 20.

The fuel addition valve 35 is arranged in the exhaust passage 21. Specifically, the fuel addition valve 35 according to the present embodiment is arranged in the exhaust passage 21 on an upstream-side portion of the exhaust catalyst 26 in the exhaust gas flow direction, more specifically, a portion corresponding to an exhaust manifold of the exhaust passage 21. The fuel addition valve 35 adds fuel to exhaust gas in the exhaust passage 21 upon reception of a command from the control apparatus 100. The control apparatus 100 according to the present embodiment executes PM regeneration process when a predetermined condition is satisfied. The PM regeneration process is a control process in which the DPF 27 is regenerated. The control apparatus 100 causes the fuel addition valve 35 to add fuel when the PM regeneration process is being executed. When the fuel addition valve 35 adds fuel to exhaust gas in the PM regeneration process, particulate matter (PM) accumulated in the DPF 27 burns, and is removed from the DPF 27. In this way, the PM regeneration process is executed.

The EGR passage 50 recirculates part of exhaust gas, emitted from the cylinders 11, to the intake passage 20. Specifically, the EGR passage 50 according to the present embodiment connects a portion on the upstream side of an intake manifold of the intake passage 20 in an intake air flow direction with a portion corresponding to the exhaust manifold of the exhaust passage 21. However, specific connection locations at which the EGR passage 50 connects with the intake passage 20 and the exhaust passage 21 are not limited to these locations. Hereinafter, exhaust gas passing through the EGR passage 50 is referred to as EGR gas. The EGR valve 51 is arranged in the EGR passage 50. The EGR valve 51 opens or closes upon reception of a command from the control apparatus 100, thus adjusting the amount of EGR gas.

The turbocharger 60 includes a turbine 61 and a compressor 62. The turbine 61 is arranged in the exhaust passage 21. The compressor 62 is arranged in the intake passage 20. The turbine 61 and the compressor 62 are coupled to each other by a coupling member. When the turbine 61 rotates upon reception of force from exhaust gas passing through the exhaust passage 21, the compressor 62 coupled to the turbine 61 also rotates. Because the compressor 62 rotates, air in the intake passage 20 is compressed. Thus, air flowing into the cylinders 11 is supercharged. The intercooler 70 is arranged in the intake passage 20 on a downstream side of the compressor 62 and on an upstream side of the throttle 22. Refrigerant is introduced into the intercooler 70. The intercooler 70 cools air in the intake passage 20 by refrigerant introduced into the intercooler 70. The flow rate of refrigerant that is introduced into the intercooler 70 is controlled by the control apparatus 100.

FIG. 1 shows the air flow sensor 80 and the temperature sensor 81 as examples of the various sensors. The air flow sensor 80 is arranged in the intake passage 20 on an upstream side of the compressor 62. The air flow sensor 80 detects the amount of air (g/s) passing through the intake passage 20, and transmits the detected result to the control apparatus 100. The control apparatus 100 acquires the intake air amount that is taken into the cylinders 11 on the basis of the detected result of the air flow sensor 80. The temperature sensor 81 detects the temperature of exhaust gas in the exhaust passage 21, and transmits the detected result to the control apparatus 100. The temperature sensor 81 according to the present embodiment is arranged in the exhaust passage 21 at a portion on an upstream side of the exhaust catalyst 26 and on a downstream side of the portion at which the turbocharger 60 is arranged. However, the specific arrangement location of the temperature sensor 81 is not limited to this location. In addition to these sensors, the internal combustion engine 5 includes various sensors that detect information required for the operation of the internal combustion engine 5. The various sensors include a crank position sensor, and the like.

The control apparatus 100 controls the internal combustion engine 5. In the present embodiment, an electronic control unit including a microcomputer is used as an example of the control apparatus 100. The microcomputer of the control apparatus 100 includes a central processing unit (CPU) 101, a read only memory (ROM) 102 and a random access memory (RAM) 103. The CPU 101 executes control processing, arithmetic processing, and the like. The CPU 101 executes processes regarding steps of flowcharts (described later). The ROM 102 and the RAM 103 each have the function of a storage unit that stores information required for the operation of the CPU 101.

The control apparatus 100 controls the fuel injection valves 30 such that main injection is carried out toward each cylinder 11 at a predetermined timing. The control apparatus 100 controls the fuel injection valves 30 such that additional injection is carried out toward each cylinder 11 at a timing later than that of main injection. For example, after-injection or post-injection may be used as the additional injection. After-injection and post-injection each are an injection mode in which fuel is injected from each fuel injection valve 30 at a predetermined timing later than that of main injection; however, after-injection is carried out at a timing earlier than post-injection (a timing closer to main injection). The control apparatus 100 according to the present embodiment carries out after-injection as an example of additional injection.

Figure 2A:
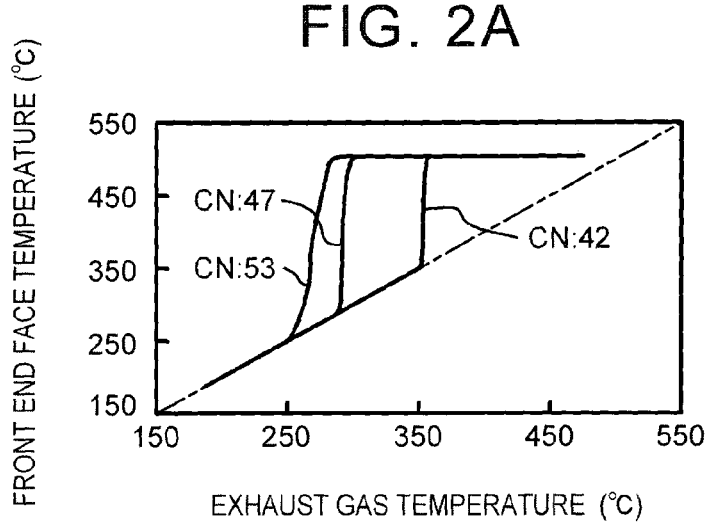
FIG. 2A is a schematic graph that shows the correlation between a front end face temperature of an exhaust catalyst and an exhaust gas temperature.

Subsequently, the details of additional injection of the control apparatus 100 will be described. Before the description, the above-described inconvenience that the invention attempts to solve will be described in detail again with reference to the drawings. FIG. 2A is a schematic graph that shows the correlation between a front end face temperature of the exhaust catalyst 26 (a temperature at a front end face that is a portion through which exhaust gas flows in first in the exhaust catalyst 26) and an exhaust gas temperature. Specifically, FIG. 2A schematically shows a measured result of a change in front end face temperature to an exhaust gas temperature in the case of fuels respectively having cetane numbers of 42, 47, 53. The data shown in FIG. 2A are measured under the condition that the rotation speed (rpm) of the internal combustion engine 5 ranges from 1000 to 3200 and the fuel injection amount ($mm^3$/st) ranges from 10 to 45. The cetane number is an index indicating the ignitability of a fuel. As the cetane number decreases, the ignitability deteriorates.

Figure 2B:
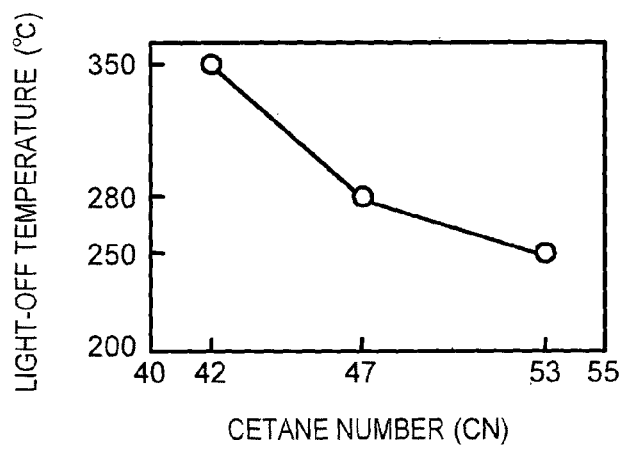
FIG. 2B is a schematic graph that shows the correlation between a light-off temperature of the exhaust catalyst and the cetane number of a fuel.

In FIG. 2A, when the cetane number is 53, the front end face temperature steeply increases at 250° C. When the cetane number is 47, the front end face temperature steeply increases at 280° C. When the cetane number is 42, the front end face temperature steeply increases at 350° C. From these results, it is found that the light-off temperature is 350° C. when the cetane number is 42, the light-off temperature is 280° C. when the cetane number is 47, and the light-off temperature is 250° C. when the cetane number is 53. FIG. 2B collectively shows the results of FIG. 2A, and, specifically, FIG. 2B schematically shows the correlation between a light-off temperature of the exhaust catalyst 26 and the cetane number of a fuel. FIG. 2B indicates that the light-off temperature increases as the cetane number decreases.

In the case of the technique described in JP 2007-231790 A, fluctuations in the light-off temperature with a change in the cetane number are not taken into consideration. Therefore, for example, if a fuel having a lower cetane number than an initially set value (designed value) is used, there is a possibility that an increase in the temperature of the exhaust catalyst 26 is insufficient at the time when the exhaust catalyst 26 is heated. In this case, there is a possibility that a deposit may accumulate in the exhaust catalyst 26. Specifically, there is a possibility that a deposit accumulates particularly at the front end face of the exhaust catalyst 26. In this case, there is a possibility that the front end face of the exhaust catalyst 26 is clogged with a deposit, with the result that there is a possibility that it is difficult for exhaust gas to smoothly pass through the exhaust catalyst 26.

Therefore, the control apparatus 100 according to the present embodiment executes control processing for heating the exhaust catalyst 26 (hereinafter, referred to as heating control) described below in order to suppress accumulation of a deposit in the exhaust catalyst 26 when the fuel having a low cetane number is used. Specifically, the control apparatus 100 acquires the cetane number of a fuel, acquires a target light-off temperature that is the light-off temperature of the exhaust catalyst 26 based on the acquired cetane number, acquires the exhaust gas temperature in the exhaust passage 21 on the basis of the detected result of the temperature sensor 81, and controls additional injection on the basis of a difference between the acquired exhaust gas temperature and the target light-off temperature at the time when the exhaust catalyst 26 is heated. Specifically, the control apparatus 100 controls additional injection so that the difference between the exhaust gas temperature and the target light-off temperature decreases. The outline of the heating control will be described below with reference to the drawings.

Figure 2C:
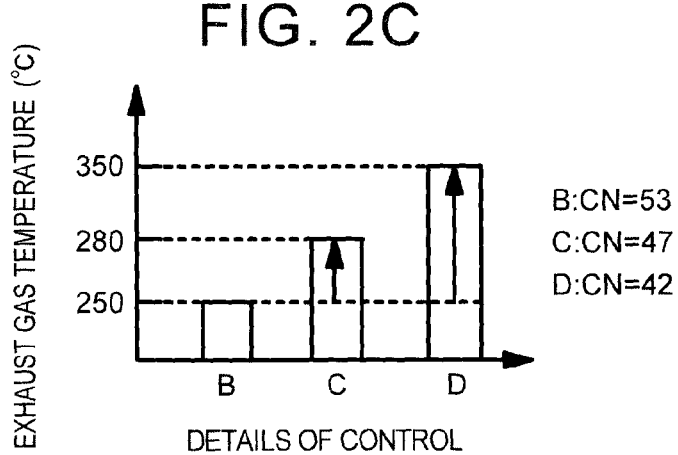
FIG. 2C is a schematic graph for illustrating the outline of heating control according to the first embodiment.

FIG. 2C is a schematic graph for illustrating the outline of heating control according to the present embodiment. The ordinate axis represents exhaust gas temperature, and the abscissa axis represents details of control of the control apparatus 100. In the abscissa axis, control B indicates the details of control when the cetane number is 53, control C indicates the details of control when the cetane number is 47, and control D indicates the details of control when the cetane number is 42. Here, in the case of control B in FIG. 2C, it is assumed that the temperature acquired on the basis of the detected result of the temperature sensor 81 is 250° C. (the target light-off temperature when the cetane number is 53). In this case, the control apparatus 100 does not carry out additional injection. This is because the temperature of the exhaust catalyst 26 has already reached the target light-off temperature when the exhaust catalyst 26 is heated even when additional injection is not carried out and, as a result, the above-described inconvenience does not occur.

In the case of control C in FIG. 2C, it is assumed that the exhaust gas temperature before additional injection is carried out is 250° C. In this case, the control apparatus 100 increases the fuel injection amount for additional injection so that the exhaust gas temperature becomes 280° C. (the target light-off temperature when the cetane number is 47). Similarly, in the case of control D in FIG. 2C, it is assumed that the exhaust gas temperature before additional injection is carried out is 250° C. In this case, the control apparatus 100 increases the fuel injection amount for additional injection so that the exhaust gas temperature becomes 350° C. (the target light-off temperature when the cetane number is 42). In this way, the control apparatus 100 according to the present embodiment controls additional injection, thus increasing the actual exhaust gas temperature to the target light-off temperature based on the cetane number.

Figure 3:
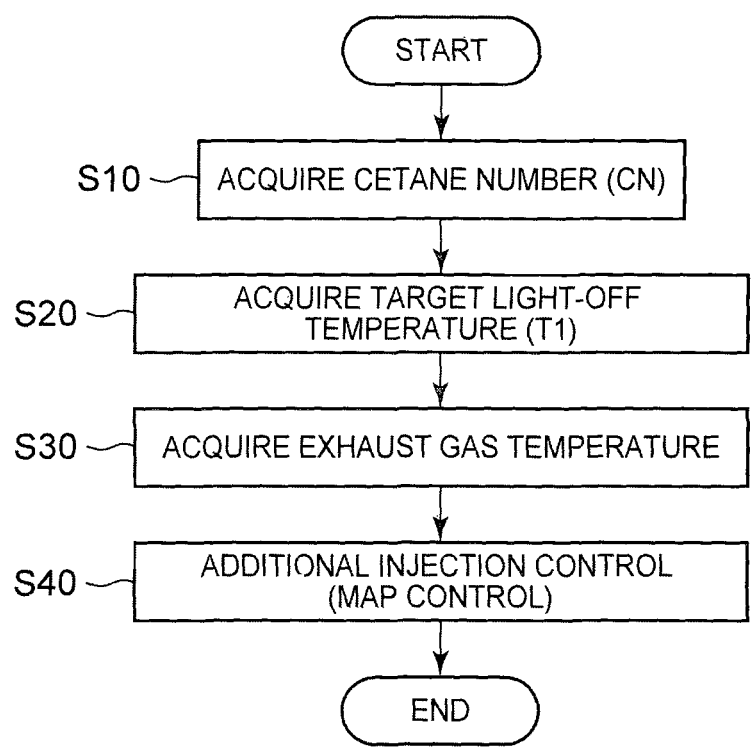
FIG. 3 is a view that shows an example of a flowchart at the time when the control apparatus according to the first embodiment executes heating control.

The above-described heating control of the control apparatus 100 will be described below in detail with reference to the flowchart. FIG. 3 is a view that shows an example of the flowchart at the time when the control apparatus 100 according to the present embodiment executes heating control. The control apparatus 100 initially starts the flowchart shown in FIG. 3 when the exhaust catalyst 26 is heated. In the present embodiment, the time when the exhaust catalyst 26 is heated, for example, includes, the time when the internal combustion engine 5 is started up, more specifically, the time when an ignition key (IG) of the internal combustion engine 5 is turned on. The ignition key is a key switch that is arranged at a driver seat of the vehicle on which the internal combustion engine 5 is mounted and that is operated by a user. The control apparatus 100 starts up the internal combustion engine 5 when the ignition key is turned on, and stops the internal combustion engine 5 when the ignition key is turned off. Flow of exhaust gas into the exhaust catalyst 26 begins as the internal combustion engine 5 starts up, so heating of the exhaust catalyst 26 is started. The control apparatus 100 repeatedly executes the flowchart shown in FIG. 3 at predetermined intervals.

Initially, the control apparatus 100 acquires the cetane number (CN) of a fuel (step S10). Specifically, the control apparatus 100 according to the present embodiment acquires the cetane number on the basis of an index that correlates with the cetane number. In the present embodiment, the specific gravity of a fuel is used as an example of the index. The specific gravity of a fuel is inversely proportional to the cetane number. Specifically, the internal combustion engine 5 according to the present embodiment includes a specific gravity sensor (not shown) in the fuel tank 42. The specific gravity sensor detects the specific gravity of a fuel. A map that defines the specific gravity of a fuel in association with the cetane number is prestored in the storage unit (for example, the ROM 102). In step S10, the control apparatus 100 acquires the cetane number corresponding to the specific gravity of a fuel, detected by the specific gravity sensor, from the map, thus acquiring the cetane number. A specific method of acquiring the cetane number by the control apparatus 100 is not limited to this configuration. A known other method may be used.

After step S10, the control apparatus 100 acquires a target light-off temperature (T1) (step S20). The map that defines the cetane number in association with the target light-off temperature is prestored in the storage unit (for example, the ROM 102) of the control apparatus 100 according to the present embodiment. When the map is shown in graph, the graph is as shown in FIG. 2B. The control apparatus 100 extracts the target light-off temperature, corresponding to the cetane number acquired in step S10, from the map, and acquires the extracted target light-off temperature as the target light-off temperature (T1) in step S20.

After step S20, the control apparatus 100 acquires the exhaust gas temperature in the exhaust passage 21 (step S30). Specifically, the control apparatus 100 acquires the exhaust gas temperature in the exhaust passage 21 on the basis of the detected result of the temperature sensor 81. That is, in step S30, the control apparatus 100 acquires an actual exhaust gas temperature (actual exhaust gas temperature) at the timing at which step S30 is executed. A method of acquiring the exhaust gas temperature by the control apparatus 100 is not limited to this configuration. For example, the control apparatus 100 may acquire the exhaust gas temperature on the basis of an index that correlates with the exhaust gas temperature (for example, a load of the internal combustion engine 5, or the like).

After step S30, the control apparatus 100 executes additional injection control (step S40). Specifically, the control apparatus 100 acquires a difference ($\Delta T$) between the target light-off temperature (T1) acquired in step S20 and the exhaust gas temperature acquired in step S30, and controls an injection amount for additional injection so that the acquired difference ($\Delta T$) is reduced. The close details of control of step S40 is as follows.

The map (MAP) of the fuel injection amount for additional injection so that the exhaust gas temperature (actual exhaust gas temperature) becomes the target light-off temperature is prestored in the storage unit (for example, the ROM 102) of the control apparatus 100 according to the present embodiment. Specifically, the map defines the fuel injection amount for additional injection in association with the difference between the target light-off temperature and the exhaust gas temperature (actual exhaust gas temperature). The map is defined such that the exhaust gas temperature (actual exhaust gas temperature) increases to become the target light-off temperature when the fuel injection amount for additional injection, extracted from the map, is injected at the time of actual additional injection. A plurality of the maps are prepared in association with cetane numbers. The control apparatus 100 selects the map corresponding to the cetane number acquired in step S10 from among the plurality of maps stored in the storage unit. The control apparatus 100 extracts the injection amount of fuel for additional injection, corresponding to the difference ($\Delta T$) between the target light-off temperature (T1) and the exhaust gas temperature, from the selected map, and controls the fuel injection valves 30 so that fuel in the extracted injection amount is injected. The control apparatus 100 executes step S40 in this way.

This will be described as follows by way of a specific example. It is assumed that the map in the case where the cetane number is 53 has been selected before the flowchart of FIG. 3 is, executed for the first time. When the cetane number is acquired as 42 as a result of execution of step S10 of FIG. 3, the control apparatus 100 selects the map for the cetane number of 42 (that is, the control apparatus 100 changes the map) in step S40. The map for the cetane number of 42 defines the fuel injection amount for additional injection such that the exhaust gas temperature becomes 350° C. that is the target light-off temperature as described above. The control apparatus 100 extracts the injection amount of fuel for additional injection, corresponding to the difference ($\Delta T$) between the target light-off temperature and the exhaust gas temperature, from the map in step S40, and controls the fuel injection valves 30 so that the fuel in the extracted injection amount is injected at the time of additional injection, thus causing the exhaust gas temperature to become 350° C. After step S40, the control apparatus 100 ends execution of the flowchart.

In the present embodiment, the CPU 101 of the control apparatus 100, which executes step S10, corresponds to a member having the function of a cetane number acquisition unit that acquires the cetane number of a fuel for the internal combustion engine 5. The CPU 101 that executes step S20 corresponds to a member having the function of a target light-off temperature acquisition unit that acquires the target light-off temperature. The CPU 101 that executes step S30 corresponds to a member having the function of an exhaust gas temperature acquisition unit that acquires the exhaust gas temperature (actual exhaust gas temperature) of the internal combustion engine 5. The CPU 101 that executes step S40 corresponds to a member having the function of a control unit that, when the exhaust catalyst 26 is heated, controls additional injection on the basis of the difference between the target light-off temperature acquired by the target light-off temperature acquisition unit and the exhaust gas temperature acquired by the exhaust gas temperature acquisition unit.

As described above, with the control apparatus 100 according to the present embodiment, by carrying out additional injection in step S40, it is possible to increase the exhaust gas temperature to the target light-off temperature (the light-off temperature of the exhaust catalyst 26 based on the cetane number). Thus, even when a fuel having a low cetane number is used, it is possible to suppress accumulation of a deposit in the exhaust catalyst 26. As a result, it is possible to suppress occurrence of clogging due to a deposition at the front end face of the exhaust catalyst 26.

With the control apparatus 100 according to the present embodiment, it is possible to early activate the exhaust catalyst 26. Therefore, after that, when the above-described PM regeneration process (the process of regenerating the DPF 27 by using the fuel addition valve 35) is executed, it is possible to effectively increase the temperature of exhaust gas flowing into the DPF 27. Thus, it is also easy to effectively remove PM in the DPF 27.

The control apparatus 100 according to the present embodiment controls the fuel injection amount for additional injection, specifically, the fuel injection amount for after-injection, in additional injection control in step S40; however, the details of additional injection control are not limited to this configuration. For example, the control apparatus 100 may control the fuel injection timing for additional injection in step S40. A specific example of this configuration will be described as follows. The exhaust gas temperature tends to increase as the fuel injection timing for additional injection is retarded with respect to a reference fuel injection timing. Therefore, the control apparatus 100 retards the fuel injection timing for additional injection in step S40. In this case, the control apparatus 100 increases the exhaust gas temperature to the target light-off temperature by retarding the fuel injection timing for additional injection as the difference between the target light-off temperature (T1) and the exhaust gas temperature increases in step S40.

The control apparatus 100 may use post-injection instead of after-injection as the additional injection in step S40.

Next, the control apparatus 100 for an internal combustion engine according to a second embodiment of the invention will be described. The hardware configuration of the internal combustion engine 5 to which the control apparatus 100 according to the present embodiment is applied is similar to that of the first embodiment, so FIG. 1 is used as the overall view of the internal combustion engine 5 in the present embodiment as well. The control apparatus 100 according to the present embodiment differs from the control apparatus 100 according to the first embodiment in that, when the exhaust catalyst 26 is heated, the concentration of oxygen in each cylinder (in each cylinder 11) of the internal combustion engine 5 at the time when additional injection is carried out is further controlled on the basis of the difference between the exhaust gas temperature and the target light-off temperature. Specifically, the control apparatus 100 according to the present embodiment differs from the control apparatus 100 according to the first embodiment in that the flowchart shown in FIG. 4, which will be described below, is executed instead of the flowchart shown in FIG. 3 according to the first embodiment.

FIG. 4 is a view that shows an example of the flowchart at the time when the control apparatus 100 according to the present embodiment executes heating control. The flowchart of FIG. 4 differs from the flowchart of FIG. 3 in that step S31 is further included. The control apparatus 100 executes step S31 after execution of step S30, and executes step S40 after execution of step S31. Step S31, as well as the other steps, is executed when the exhaust catalyst 26 is heated.

In step S31, the control apparatus 100 increases the concentration of oxygen in each cylinder at the time when additional injection is carried out (hereinafter, this control is referred to as in-cylinder oxygen concentration increasing control). Specifically, the control apparatus 100 controls the opening degree of the throttle 22 so that the amount of air that is taken into each cylinder 11 (intake air amount) increases, thus increasing the concentration of oxygen in each cylinder at the time when additional injection in step S40 is carried out. More specifically, the control apparatus 100 increases the intake air amount by increasing the opening degree of the throttle 22 above a predetermined value (this is the opening degree of the throttle 22 before step S31 is executed) (that is, reducing the throttle amount of the throttle 22). As a result of an increase in the intake air amount, the concentration of oxygen in each cylinder also increases.

In the present embodiment, the CPU 101 of the control apparatus 100, which executes step S31, corresponds to a member having the function of a control unit that, when the exhaust catalyst 26 is heated, further controls the concentration of oxygen in each cylinder of the internal combustion engine 5 at the time when additional injection is carried out on the basis of the difference between the exhaust gas temperature acquired by the exhaust gas temperature acquisition unit and the target light-off temperature acquired by the target light-off temperature acquisition unit.

With the control apparatus 100 according to the present embodiment, in addition to the advantageous effects obtained by the control apparatus 100 according to the first embodiment, the following advantageous effect is obtained. Specifically, with the control apparatus 100 according to the present embodiment, because the concentration of oxygen in each cylinder increases as a result of execution of in-cylinder oxygen concentration increasing control in step S31, it is possible to activate combustion in each cylinder 11 at the time when additional injection control in step S40 is executed. Thus, it is possible to suppress deterioration of a combustion state in each cylinder of the internal combustion engine 5.

As described above, the control apparatus 100 according to the present embodiment increases the concentration of oxygen in each cylinder by controlling the throttle 22 in step S31; however, specific details of control in step S31 are not limited to this configuration. For example, the control apparatus 100 may increase the concentration of oxygen in each cylinder by reducing the temperature of air that is taken into each cylinder 11 (intake air temperature) in step S31. The reason why the concentration of oxygen in each cylinder increases as the intake air temperature decreases is that the density of air that is taken into each cylinder 11 increases because of a decrease in intake air temperature and, as a result, the concentration of oxygen in air that is taken into each cylinder 11 increases.

Specifically, the control apparatus 100 just needs to increase the flow rate of refrigerant that is introduced into the intercooler 70 in decreasing the intake air temperature. More specifically, the control apparatus 100 just needs to increase the flow rate of refrigerant that is introduced into the intercooler 70 by increasing the rotation speed of a pump (this pump is not shown in FIG. 1) that introduces refrigerant into the intercooler 70. When the flow rate of refrigerant in the intercooler 70 increases, the intake air cooling capacity of the intercooler 70 increases, with the result that it is possible to reduce the intake air temperature.

The concentration of oxygen in each cylinder tends to increase as the position of the piston becomes closer to the top dead center. Therefore, the control apparatus 100 may execute control for bringing the timing of additional injection close to the top dead center (TDC) as another example of step S31. In this case, the control apparatus 100 just needs to change the timing of additional injection to a predetermined timing closer to the top dead center than a predetermined timing (this is the injection timing of additional injection, set before step S31 is executed) in step S31, and subsequently to increase the fuel injection amount for additional injection in step S40.

Next, the control apparatus 100 for an internal combustion engine according to a third embodiment of the invention will be described. The hardware configuration of the internal combustion engine 5 to which the control apparatus 100 according to the present embodiment is applied is similar to those of the first and second embodiments, so FIG. 1 is used as the overall view of the internal combustion engine 5 in the present embodiment as well. The control apparatus 100 according to the present embodiment differs from that of the second embodiment in the details of heating control. Specifically, the control apparatus 100 according to the present embodiment differs from the control apparatus 100 according to the second embodiment in that, when the exhaust catalyst 26 is heated, additional injection is controlled further on the basis of the intake air amount. The outline of heating control that is executed by the control apparatus 100 according to the present embodiment will be described with reference to the drawings.

Figure 5A:
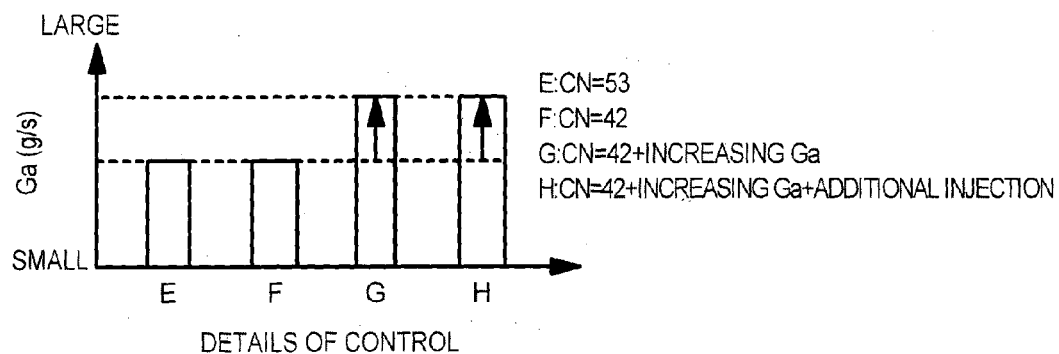
FIG. 5A is a schematic graph for illustrating the outline of heating control according to a third embodiment, showing the correlation between an intake air amount (Ga) and details of control.
Figure 5B:
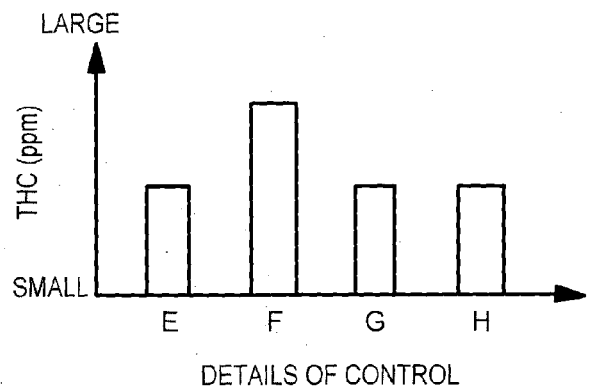
FIG. 5B is a schematic graph for illustrating the outline of heating control according to the third embodiment, showing the correlation between total hydrocarbons (THC) in exhaust gas and details of control.
Figure 5C:
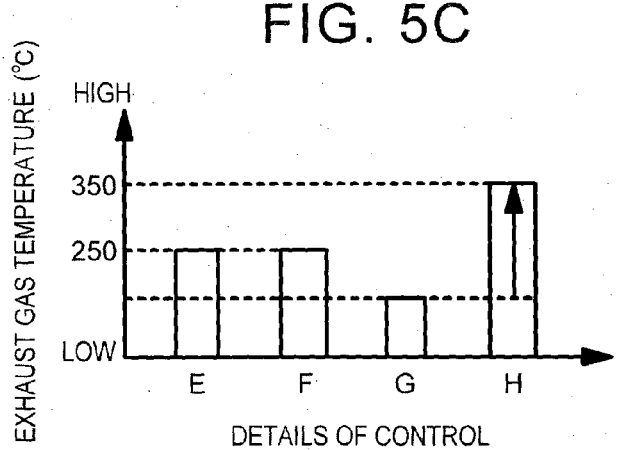
FIG. 5C is a schematic graph for illustrating the outline of heating control according to the third embodiment, showing the correlation between an exhaust gas temperature and details of control.

FIG. 5A, FIG. 5B, and FIG. 5C are schematic graphs for illustrating the outline of heating control according to the present embodiment. Specifically, FIG. 5A shows the correlation between an intake air amount (Ga) and details of control, FIG. 5B shows the correlation between total hydrocarbons (THC) in exhaust gas and details of control, and FIG. 5C shows the correlation between an exhaust gas temperature and details of control. In the abscissa axes of FIG. 5A, FIG. 5B and FIG. 5C, control E shows the case where in-cylinder oxygen concentration increasing control and additional injection control are not executed when the cetane number of a fuel is 53. Control F shows the case where in-cylinder oxygen concentration increasing control and additional injection control are not executed when the cetane number of a fuel is 42. Control G shows the case where control for increasing the intake air amount is executed as in-cylinder oxygen concentration increasing control but additional injection control is not executed when the cetane number of a fuel is 42. Control H shows one example of heating control according to the present embodiment and, specifically, shows the case where control for increasing the intake air amount is executed as in-cylinder oxygen concentration increasing control and additional injection control based on the intake air amount is also executed when the cetane number of a fuel is 42.

When control E is compared with control F, THC increases as shown in FIG. 5B because the cetane number of control F is smaller than that of control E. When the intake air amount is increased as in-cylinder oxygen concentration increasing control as in the case of control G in FIG. 5A, deterioration of a combustion state is suppressed by an increase in oxygen in each cylinder, with the result that THC of control G is smaller than that of control F as shown in FIG. 5B. On the other hand, in the case of control G, with an increase in the intake air amount, the exhaust gas temperature is lower than that of control F (see FIG. 5C). In the case of the above-described second embodiment, the exhaust gas temperature is increased by executing additional injection control after the intake air amount is increased, so it is conceivable that the exhaust gas temperature does not decrease so much as in the case of control G in FIG. 5C, but it is conceivable that the exhaust gas temperature decreases to some extent by the amount by which the intake air amount is increased in the case of the second embodiment as well.

In order to compensate for a decrease in the exhaust gas temperature due to an increase in the intake air amount, the control apparatus 100 according to the present embodiment executes additional injection further in consideration of the intake air amount, thus suppressing an increase in THC as shown in FIG. 5B while suppressing a decrease in the exhaust gas temperature as in the case of control H shown in FIG. 5C. Specifically, the control apparatus 100 according to the present embodiment increases the fuel injection amount for additional injection as the difference between the exhaust gas temperature and the target light-off temperature increases, and further increases the fuel injection amount for additional injection as the intake air amount increases. The details of heating control that is executed by the control apparatus 100 according to the present embodiment will be described as follows with reference to the flowchart.

Figure 6:
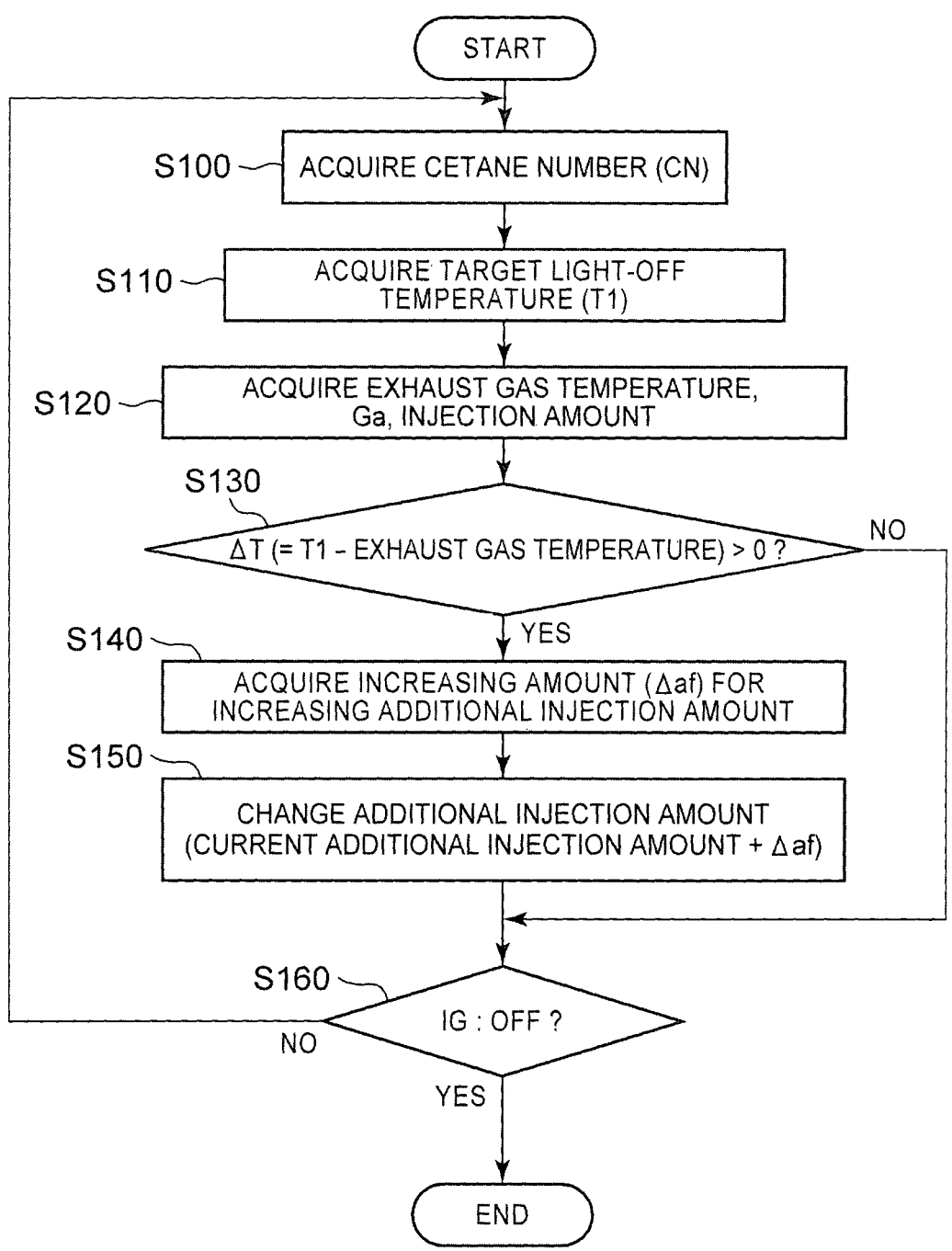
FIG. 6 is a view that shows an example of a flowchart at the time when a control apparatus according to the third embodiment executes heating control.

FIG. 6 is a view that shows an example of the flowchart at the time when the control apparatus 100 according to the present embodiment executes heating control. The control apparatus 100 executes the flowchart of FIG. 6 by an interrupt after step S40 is executed in the flowchart of FIG. 4 according to the above-described second embodiment. The control apparatus 100 repeatedly executes the flowchart of FIG. 6 at predetermined intervals.

Initially, the control apparatus 100 acquires the cetane number (CN) of a fuel (step S100). The specific details of step S100 are similar to those of step S10 in FIG. 3 and FIG. 4, so the description is omitted. After step S100, the control apparatus 100 acquires a target light-off temperature (T1) (step S110). The specific details of step S110 are similar to those of step S20 in FIG. 3 and FIG. 4, so the description is omitted.

After step S120, the control apparatus 100 acquires the exhaust gas temperature in the exhaust passage 21, the intake air amount (Ga) of the internal combustion engine 5 and the fuel injection amount of each fuel injection valve 30 (step S120). That is, in step S120, the control apparatus 100 acquires the actual exhaust gas temperature (actual exhaust gas temperature), the intake air amount (actual intake air amount) and the fuel injection amount (actual fuel injection amount) at present moment. The control apparatus 100 acquires the exhaust gas temperature on the basis of the detected result of the temperature sensor 81. The control apparatus 100 acquires the intake air amount on the basis of the detected result of the air flow sensor 80. The control apparatus 100 acquires the fuel injection amount at the timing of execution of step S120 from the fuel injection amount map prestored in the storage unit (for example, the ROM 102). The exhaust gas temperature and the intake air amount may be acquired not directly by the sensors but indirectly on the basis of indices that correlate with these exhaust gas temperature and the intake air amount. The CPU 101 of the control apparatus 100, which executes step S120, corresponds to a member having the function of an exhaust gas temperature acquisition unit that acquires the exhaust gas temperature, an intake air amount acquisition unit that acquires the intake air amount and a fuel injection amount acquisition unit that acquires the fuel injection amount.

After step S120, the control apparatus 100 determines whether the difference ($\Delta T$) between the target light-off temperature (T1) acquired in step S110 and the exhaust gas temperature acquired in step S120 (step S130) is larger than zero. When negative determination is made in step S130 (that is, when the exhaust gas temperature is higher than or equal to the target light-off temperature), the control apparatus 100 executes step S160 (described later).

On the other hand, when affirmative determination is made in step S130 (that is, when the exhaust gas temperature is lower than the target light-off temperature), the control apparatus 100 acquires an increasing amount ($\Delta af$) for increasing an additional injection amount (step S140). Specifically, the control apparatus 100 acquires the increasing amount for increasing the additional injection amount on the basis of the following mathematical expression (1).

$$\Delta af = m \times Cv \times \Delta T \div Q \div \rho \qquad (1)$$

In the mathematical expression (1), m is the sum of the mass (g) of the intake air amount and the mass (g) of the fuel injection amount. The control apparatus 100 calculates m on the basis of the intake air amount and fuel injection amount acquired in step S120. Cv is the specific heat of air. Cv is a constant, and is prestored in the storage unit. $\Delta T$ is calculated in step S130. Q is the amount of heat generated by a fuel, and is prestored in the storage unit. $\rho$ is the density of a fuel, and is prestored in the storage unit.

As is apparent from the above-described mathematical expression (1), the control apparatus 100 at least uses the intake air amount (Ga) acquired in step S120 (in calculation of m) in calculating the increasing amount $\Delta af$ for increasing the additional injection amount. That is, the control apparatus 100 according to the present embodiment calculates the increasing amount for increasing the additional injection amount on the basis of the intake air amount acquired in step S110.

After step S140, the control apparatus 100 changes the additional injection amount (step S150). Specifically, the control apparatus 100 changes the additional injection amount by adding the increasing amount (Δaf) for increasing the additional injection amount, acquired in step S140, to the currently set additional injection amount and then storing the resultant amount in the storage unit as a new additional injection amount. When additional injection control is, for example, carried out in step S40 of FIG. 4 after step S150 is executed, fuel in the new additional injection amount (changed additional injection amount) obtained in step S150 is injected from the fuel injection valves 30. That is, by executing step S150 according to the present embodiment, the control apparatus 100 controls additional injection on the basis of not only the difference between the exhaust gas temperature and the target light-off temperature but also the intake air amount (Ga).

The new additional injection amount obtained in step S150 is increased by Δaf from the additional injection amount acquired on the basis of the difference between the exhaust gas temperature and the target light-off temperature (the above-described currently set additional injection amount), and Δaf increases as the intake air amount increases as is apparent from the mathematical expression (1) (because m increases). Therefore, by executing step S150, the control apparatus 100 according to the present embodiment increases the fuel injection amount for additional injection as the difference between the exhaust gas temperature and the target light-off temperature increases, and increases the fuel injection amount for additional injection as the intake air amount increases.

After step S150, the control apparatus 100 determines whether the ignition key (IG) of the internal combustion engine 5 is turned off (step S160). When affirmative determination is made in step S160, the control apparatus 100 ends execution of the flowchart. When negative determination is made in step S160, the control apparatus 100 executes step S100. As described above, heating control according to the present embodiment is executed.

With the control apparatus 100 according to the present embodiment, in addition to the advantageous effects of the control apparatus 100 according to the second embodiment, the following advantageous effect is obtained. Specifically, with the control apparatus 100 according to the present embodiment, as described above, because, when the exhaust catalyst 26 is heated, additional injection is controlled further on the basis of the intake air amount (Ga) acquired by the intake air amount acquisition unit (the CPU 101 that executes step S120), so it is possible to suppress a decrease in the exhaust gas temperature when the intake air amount has increased. As a result, it is possible to further effectively suppress accumulation of a deposit in the exhaust catalyst 26.

In step S140 according to the present embodiment, the control apparatus 100 calculates an increasing amount for increasing the additional injection amount. However, specific details of control in step S140 are not limited to this configuration. For example, if the control apparatus 100 has retarded the fuel injection timing for additional injection in additional injection control in step S40 of FIG. 4, the control apparatus 100 may calculate an increasing amount for increasing the retardation amount of the fuel injection timing for additional injection in step S140 of FIG. 6. In this case, in step S150, the control apparatus 100 just needs to further retard the currently set injection timing by the retardation amount calculated in step S140.

Next, the control apparatus 100 for an internal combustion engine according to an alternative embodiment to the third embodiment will be described. Initially, an inconvenience that should be further solved by the control apparatus 100 according to the present alternative embodiment will be described. When the additional injection amount for additional injection is increased, it is possible to suppress accumulation of a deposit in the exhaust catalyst 26 when a fuel having a low cetane number is used, as described above. However, in this case, if the amount of fuel that is injected at the time of additional injection is excessive (that is, when the additional injection amount is too much), there is a possibility that oil (lubricating oil) for the internal combustion engine 5 is diluted by the injected fuel. If this oil dilution occurs, there is a possibility that exhaust emission deteriorates. In order to further solve the inconvenience that exhaust emission deteriorates because of oil dilution as a result of an excessive amount of fuel that is injected at the time of additional injection, the control apparatus 100 according to the present alternative embodiment is designed. The control apparatus 100 according to the present alternative embodiment differs from the control apparatus 100 according to the third embodiment in that the flowchart of FIG. 7, which will be described below, is executed instead of the flowchart of FIG. 6.

Figure 7:
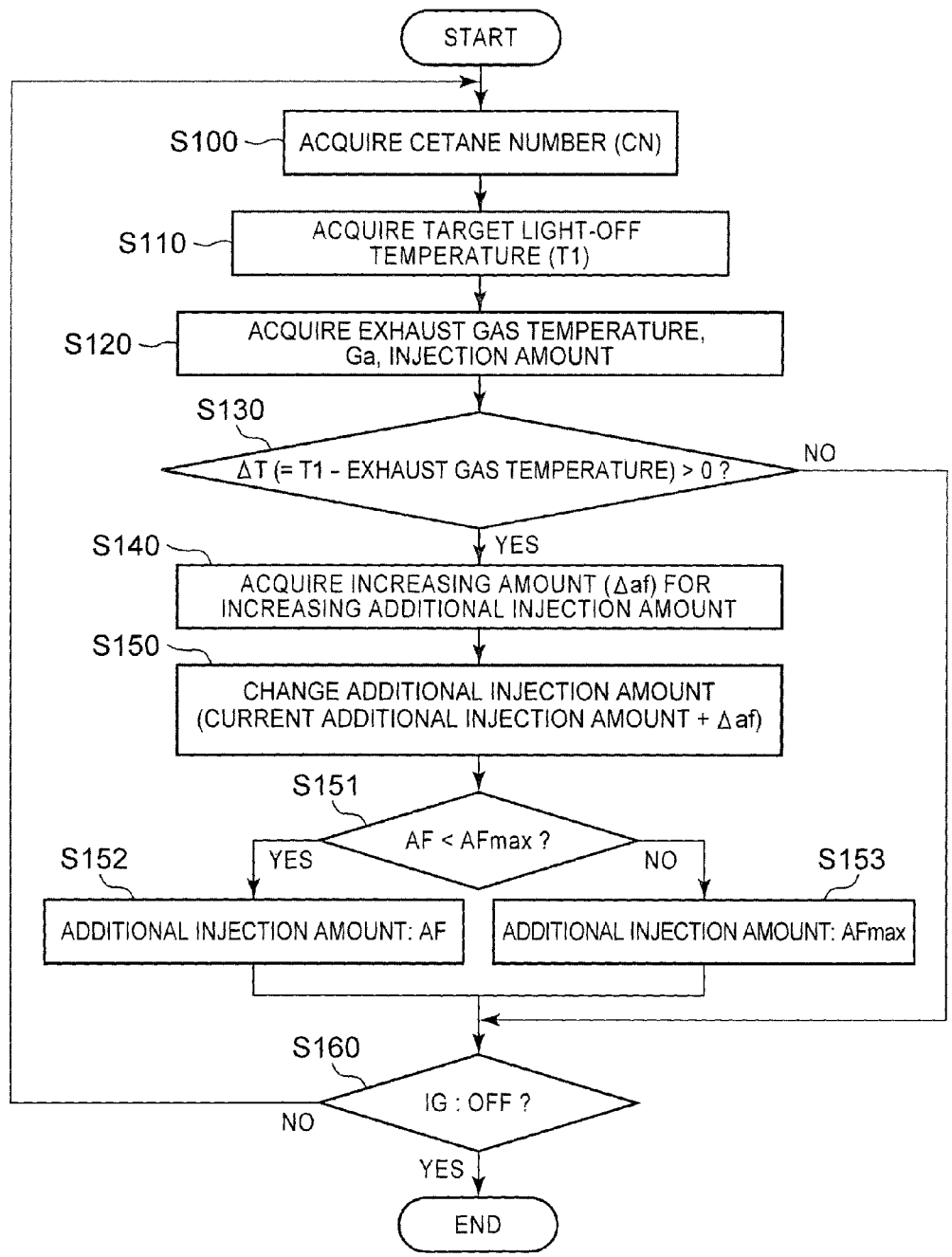
FIG. 7 is a view that shows an example of a flowchart at the time when a control apparatus according to an alternative embodiment to the third embodiment executes heating control.

FIG. 7 is a view that shows an example of the flowchart at the time when the control apparatus 100 according to the present alternative embodiment executes heating control. The flowchart of FIG. 7 differs from the flowchart of FIG. 6 in that step S151, step S152 and step S153 are further provided between step S150 and step S160. Here, the additional injection amount calculated in step S150 (this is a value obtained by adding the increasing amount (Δaf) acquired in step S140 to the currently set additional injection amount) is referred to as additional injection amount AF. The control apparatus 100 determines in step S151 whether the additional injection amount AF calculated in step S150 is smaller than a predetermined value (AFmax).

The predetermined value (AFmax) may be set such that, when fuel in an injection amount smaller than or equal to the predetermined value is injected at the time of additional injection, no oil dilution occurs or it is conceivable that oil dilution is such an extent that there is almost no influence on deterioration of exhaust emission even when there occurs oil dilution. An appropriate value just needs to be obtained as the predetermined value through an experiment, simulation, or the like, in advance, and stored in the storage unit (for example, the ROM 102).

When affirmative determination is made in step S151, the control apparatus 100 adopts the additional injection amount AF calculated in step S150 (step S152). As a result, when step S40 of FIG. 4 according to the second embodiment is executed next time, fuel in AF is injected at the time of additional injection. When negative determination is made in step S151, the control apparatus 100 adopts the predetermined amount AFmax in step S151 as a new additional injection amount (step S153). As a result, when step S40 is executed next time, fuel in AFmax is injected at the time of additional injection. After step S152 and step S153, the control apparatus 100 executes step S160.

With the control apparatus 100 according to the present alternative embodiment, by executing step S151 to step S153, it is possible to suppress the injection amount that is injected at the time of additional injection to an amount smaller than or equal to the predetermined amount AFmax. With this configuration, it is possible to suppress an excessive amount of fuel that is injected at the time of additional injection, so it is possible to suppress deterioration of exhaust emission due to oil dilution.

Next, the control apparatus 100 for an internal combustion engine according to a fourth embodiment of the invention will be described. The hardware configuration of the internal combustion engine 5 to which the control apparatus 100 according to the present embodiment is applied is similar to that of the third embodiment, so FIG. 1 is used as the overall view of the internal combustion engine 5 in the present embodiment as well. The control apparatus 100 according to the present embodiment differs from that of the third embodiment in the details of heating control. When the load of the internal combustion engine 5 changes, the exhaust gas temperature also changes, so it is conceivable that the temperature of the exhaust catalyst 26 changes. Therefore, the control apparatus 100 according to the present embodiment further considers the load of the internal combustion engine 5 in controlling additional injection. Specifically, the control apparatus 100 according to the present embodiment differs from the control apparatus 100 according to the third embodiment in that, when the exhaust catalyst 26 is heated, additional injection is controlled further on the basis of the load of the internal combustion engine 5.

Figure 8:
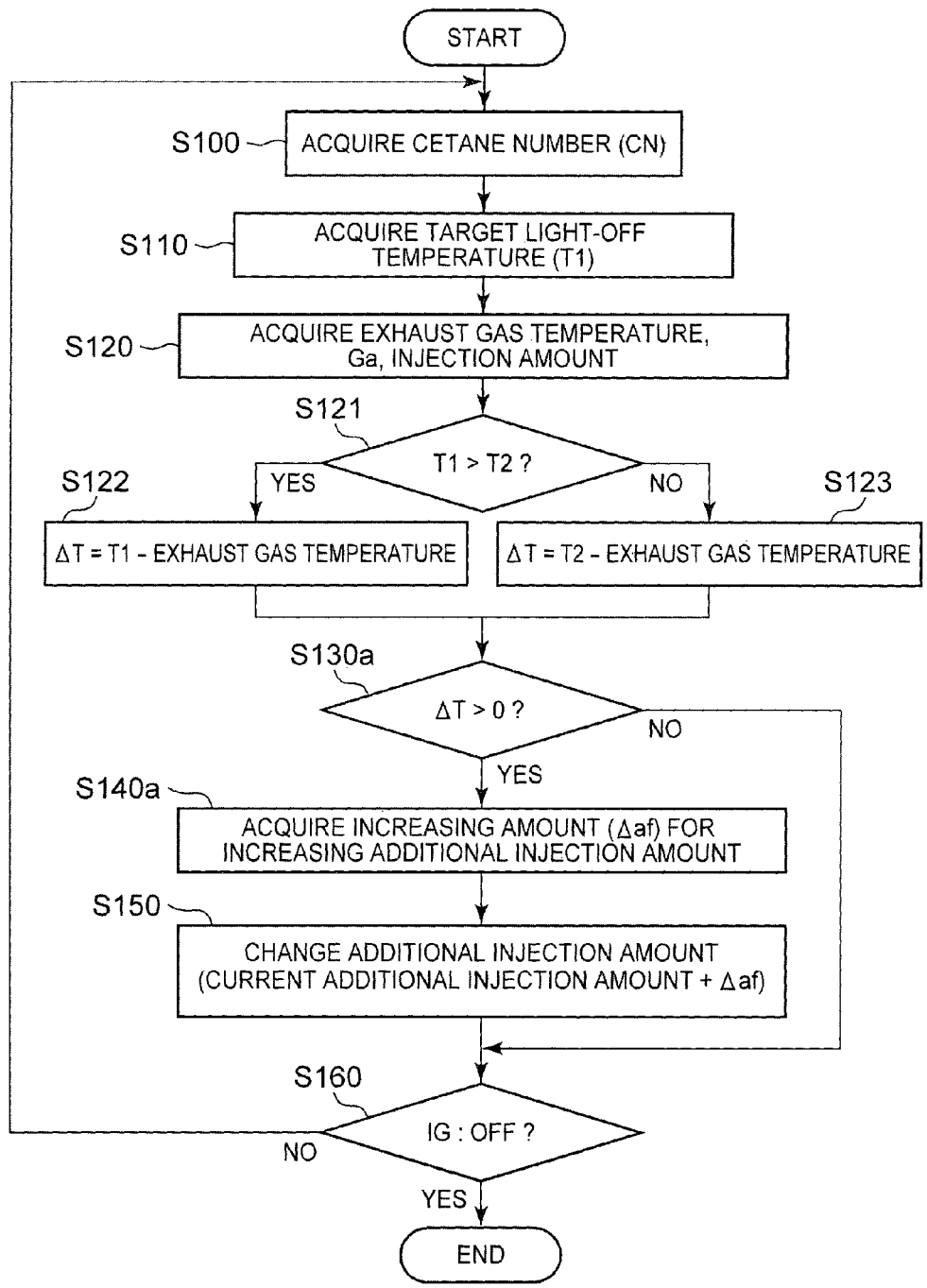
FIG. 8 is a view that shows an example of a flowchart at the time when a control apparatus according to a fourth embodiment executes heating control.

FIG. 8 is a view that shows an example of the flowchart at the time when the control apparatus 100 according to the present embodiment executes heating control. The flowchart of FIG. 8 differs from the flowchart of FIG. 6 in that step S121, step S122 and step S123 are further provided, step S130a is provided instead of step S130 and step S140a is provided instead of step S140.

The control apparatus 100 according to the present embodiment uses the fuel injection amount as a specific example of the load of the internal combustion engine 5. Thus, the control apparatus 100 according to the present embodiment acquires the fuel injection amount in step S120, so the control apparatus 100 acquires the load of the internal combustion engine 5 at the same time. That is, the CPU 101 of the control apparatus 100, which acquires the fuel injection amount in step S120 of FIG. 8, corresponds to a member having the function of a load acquisition unit that acquires the load of the internal combustion engine 5. The load of the internal combustion engine 5 is not limited to the fuel injection amount. The control apparatus 100 may use, for example, the torque (N·m) of the internal combustion engine 5 as the load of the internal combustion engine 5. In this case, the control apparatus 100 further acquires the torque of the internal combustion engine 5 in step S120. The torque of the internal combustion engine 5 may be acquired on the basis of a detected result of, for example, a torque sensor or the crank position sensor.

The control apparatus 100 executes step S121 after step S120. In step S121, when the cetane number of a fuel is a medium cetane number, the control apparatus 100 acquires an exhaust gas temperature (T2) (hereinafter, referred to as a medium-cetane-number exhaust gas temperature) at the load (fuel injection amount) acquired in step S120, and determines whether the target light-off temperature (T1) acquired in step S110 is higher than the medium-cetane-number exhaust gas temperature (T2). The medium cetane number means a cetane number of about 53. In the present embodiment, 53 is used as an example of the medium cetane number.

In step S121, specifically, the control apparatus 100 according to the present embodiment acquires the medium-cetane-number exhaust gas temperature (T2) on the basis of the map. Specifically, a map that defines the medium-cetane-number exhaust gas temperature in association with the load is prestored in the storage unit (for example, the ROM 102) of the control apparatus 100. In this case, the control apparatus 100 extracts the medium-cetane-number exhaust gas temperature corresponding to the load acquired in step S120 from the map, and acquires the extracted medium-cetane number exhaust gas temperature as T2 of step S121. However, a specific method of acquiring the medium-cetane-number exhaust gas temperature (T2) in step S121 is not limited to this configuration.

When affirmative determination is made in step S121, the control apparatus 100 acquires the difference ($\Delta T$) between the target light-off temperature (T1) acquired in step S110 and the exhaust gas temperature acquired in step S120 (step S122). On the other hand, when negative determination is made in step S121, the control apparatus 100 acquires the difference ($\Delta T$) between the medium-cetane-number exhaust gas temperature (T2) acquired in step S121 and the exhaust gas temperature acquired in step S120 (step S123).

After step S122 and step S123, the control apparatus 100 determines in step S130a whether the difference ($\Delta T$) acquired in step S122 or step S123 is larger than zero. When affirmative determination is made in step S130a, the control apparatus 100 executes step S140a. In step S140a, the control apparatus 100 acquires the increasing amount ($\Delta af$) for increasing the additional injection amount on the basis of the above-described mathematical expression (1), and the control apparatus 100 according to the present embodiment uses $\Delta T$ obtained in step S122 or step S123 as $\Delta T$ of the mathematical expression (1).

That is, the control apparatus 100 according to the present embodiment controls additional injection on the basis of the difference ($\Delta T$) between the target light-off temperature (T1) and the exhaust gas temperature (step S122, step S130a, step S140a) as in the case of the third embodiment (FIG. 6) when the target light-off temperature (T1) is higher than the medium-cetane-number exhaust gas temperature (T2) acquired on the basis of the load (when affirmative determination is made in step S121), whereas the control apparatus 100 controls additional injection on the basis of the difference ($\Delta T$) between the medium-cetane-number exhaust gas temperature (T2) and the exhaust gas temperature (step S123, step S130a, step S140a) when the medium-cetane-number exhaust gas temperature (T2) is higher than or equal to the target light-off temperature (T1) (when negative determination is made in step S121). The reason why the control apparatus 100 executes such control is as follows.

In the case where the cetane number of a fuel is the medium cetane number (53 in the present embodiment), when the load is large, the exhaust gas temperature (actual exhaust gas temperature) is also high. Therefore, when the load is large and, as a result, the exhaust gas temperature is high (when negative determination is made in step S121), it is possible to further effectively suppress accumulation of a deposit in the exhaust catalyst 26 by controlling additional injection on the basis of the difference ($\Delta T$) between the medium-cetane-number exhaust gas temperature (T2) and the actual exhaust gas temperature rather than by controlling additional injection on the basis of the difference ($\Delta T$) between the medium-cetane-number target light-off temperature (specifically, 250° C.) and the actual exhaust gas temperature. For the above reason, the control apparatus 100 according to the present embodiment executes the above-described control.

As described above, the control apparatus 100 calculates the increasing amount ($\Delta af$) for increasing the additional injection amount on the basis of the mathematical expression (1) in step S140a, and, as is apparent from the mathematical expression (1), Δaf is directly proportional to ΔT. It appears from FIG. 8 according to the present embodiment on this basis that, when the load (fuel injection amount) is relatively large, the exhaust gas temperature is also high, so ΔT that is calculated in step S122 or step S123 decreases and, as a result, Δaf that is calculated in step S140a also decreases. That is, the control apparatus 100 according to the present embodiment relatively reduces the additional injection amount as the load (fuel injection amount) relatively increases, and relatively increases the additional injection amount as the load relatively decreases. In this respect as well, the control apparatus 100 according to the present embodiment controls additional injection on the basis of the load.

With the control apparatus 100 according to the present embodiment, not only the advantageous effects of the control apparatus 100 according to the third embodiment are obtained but also it is possible to further effectively suppress accumulation of a deposit in the exhaust catalyst 26.

The control apparatus 100 according to the present embodiment may be combined with the control processing of the control apparatus 100 according to the alternative embodiment to the third embodiment. In this case, the control apparatus 100 just needs to execute a flowchart in which step S151 to step S153 according to the flowchart of FIG. 7 are incorporated in between step S150 and step S160 of the flowchart of FIG. 8.

In step S140a according to the present embodiment, the control apparatus 100 calculates an increasing amount for increasing the additional injection amount; however, specific details of control in step S140a are not limited to this configuration. For example, if the control apparatus 100 according to the present embodiment retards the fuel injection timing for additional injection in additional injection control in step S40 of FIG. 4 according to the second embodiment, the control apparatus 100 according to the present embodiment may calculate an increasing amount for increasing the retardation amount of the fuel injection timing for additional injection in step S140a of FIG. 8. Specifically, in this case, the control apparatus 100 just needs to calculate an increasing amount for increasing the retardation amount of the fuel injection timing so that the increasing amount for increasing the retardation amount of the fuel injection timing relatively increases (that is, the fuel injection timing is more retarded) as the load (fuel injection amount) relatively decreases. In this case, in step S150, the control apparatus 100 just needs to further retard the currently set injection timing by the retardation amount calculated in step S140a.

The embodiments of the invention are described in detail above; however, the invention is not limited to the above specific embodiments. The invention may be implemented in modes including various modifications or changes within the scope of the invention recited in the appended claims.

The invention claimed is:

1. A control apparatus for an internal combustion engine, the internal combustion engine including an exhaust catalyst and a fuel injection valve, the control apparatus comprising:
an electronic control unit configured to:
(a) acquire a cetane number of a fuel for the internal combustion engine;
(b) acquire a light-off temperature of the exhaust catalyst which changes on the basis of the cetane number, based on the acquired cetane number of the fuel, and set the light-off temperature as a target light-off temperature;
(c) acquire an exhaust gas temperature of the internal combustion engine; and
(d) when the exhaust catalyst is heated, control additional injection on the basis of a difference between the exhaust gas temperature and the target light-off temperature, the additional injection being carried out after main injection of the fuel injection valve.

2. The control apparatus according to claim 1, wherein the electronic control unit is configured to, when the exhaust catalyst is heated, control a concentration of oxygen in a cylinder of the internal combustion engine at the time of carrying out the additional injection on the basis of the difference between the exhaust gas temperature and the target light-off temperature.

3. The control apparatus according to claim 2, wherein the electronic control unit is configured to acquire an intake air amount of the internal combustion engine, and
the electronic control unit is configured to, when the exhaust catalyst is heated, control the additional injection on the basis of the intake air amount.

4. The control apparatus according to claim 3, wherein the electronic control unit is configured to acquire a load of the internal combustion engine, and
the electronic control unit is configured to, when the exhaust catalyst is heated, control the additional injection on the basis of the load.

5. The control apparatus according to claim 1, wherein the additional injection is one of after-injection and post-injection.

6. A control method for an internal combustion engine, the internal combustion engine including an exhaust catalyst, a fuel injection valve and an electronic control unit, the control method comprising:
acquiring, by the electronic control unit, a cetane number of a fuel for the internal combustion engine;
acquiring, by the electronic control unit, a light-off temperature of the exhaust catalyst which changes on the basis of the cetane number, based on the acquired cetane number of the fuel, and set the light-off temperature as a target light-off temperature;
acquiring, by the electronic control unit, an exhaust gas temperature of the internal combustion engine; and
when the exhaust catalyst is heated, controlling, by the electronic control unit, additional injection on the basis of a difference between the exhaust gas temperature and the target light-off temperature, the additional injection being carried out after main injection of the fuel injection valve.

7. The control method according to claim 6, further comprising:
when the exhaust catalyst is heated, controlling, by the electronic control unit, a concentration of oxygen in a cylinder of the internal combustion engine at the time of carrying out the additional injection on the basis of the difference between the exhaust gas temperature and the target light-off temperature.

8. The control method according to claim 7, further comprising:
acquiring, by the electronic control unit, an intake air amount of the internal combustion engine; and
when the exhaust catalyst is heated, controlling, by the electronic control unit, the additional injection on the basis of the intake air amount.

9. The control method according to claim 8, further comprising:

acquiring, by the electronic control unit, a load of the internal combustion engine; and when the exhaust catalyst is heated, controlling, by the electronic control unit, the additional injection on the basis of the load.

10. The control method according to claim 6, wherein the additional injection is one of after-injection and post-injection.

* * * * *